United States Patent [19]

Padgett

[11] 4,252,763
[45] Feb. 24, 1981

[54] METHOD AND APPARATUS FOR CEMENT LINING OF PIPES

[75] Inventor: Clifford A. Padgett, Stone Mountain, Ga.

[73] Assignee: Raymond International Builders, Inc., Houston, Tex.

[21] Appl. No.: 913,230

[22] Filed: Jun. 6, 1978

[51] Int. Cl.³ .......................... B29D 9/00; B05C 3/02
[52] U.S. Cl. ................................. 264/133; 239/214;
239/215; 264/269; 264/270; 425/460
[58] Field of Search ................... 264/90, 269, 270, 88,
264/89, 93, 94, 95, 96, 133; 425/460; 118/105,
600, 612; 239/214, 214.11, 214.13, 214.15, 215

[56] References Cited

U.S. PATENT DOCUMENTS

| | | | |
|---|---|---|---|
| 1,636,367 | 7/1927 | Illemann | 264/270 |
| 1,988,329 | 1/1935 | Perkins | 264/270 |
| 2,168,917 | 8/1939 | Perkins | 264/269 |
| 2,204,785 | 6/1940 | Bennett | 264/269 |
| 2,293,365 | 8/1942 | Scott | 264/269 |
| 3,069,093 | 12/1962 | Schultz | 264/269 |
| 3,257,699 | 6/1966 | Ruegsegger | 264/270 |
| 3,920,363 | 11/1975 | Holland | 264/270 |

*Primary Examiner*—Donald J. Arnold
*Attorney, Agent, or Firm*—Fitzpatrick, Cella, Harper & Scinto

[57] ABSTRACT

A pipe lining apparatus includes a distributor head which throws cement mortar centrifugally against the interior of a pipe, a trowel which smooths the cement mortar and a liquid coating spray applicator which applies a curing control substance to the trowelled lining. The spray applicator comprises an air atomizing device which produces a very fine coating spray and blows it onto the freshly applied mortar lining without disturbing the lining. Also, in one embodiment the coating spray application is mounted to swing laterally with the trowel so as to be maintained centrally in the pipe.

25 Claims, 12 Drawing Figures

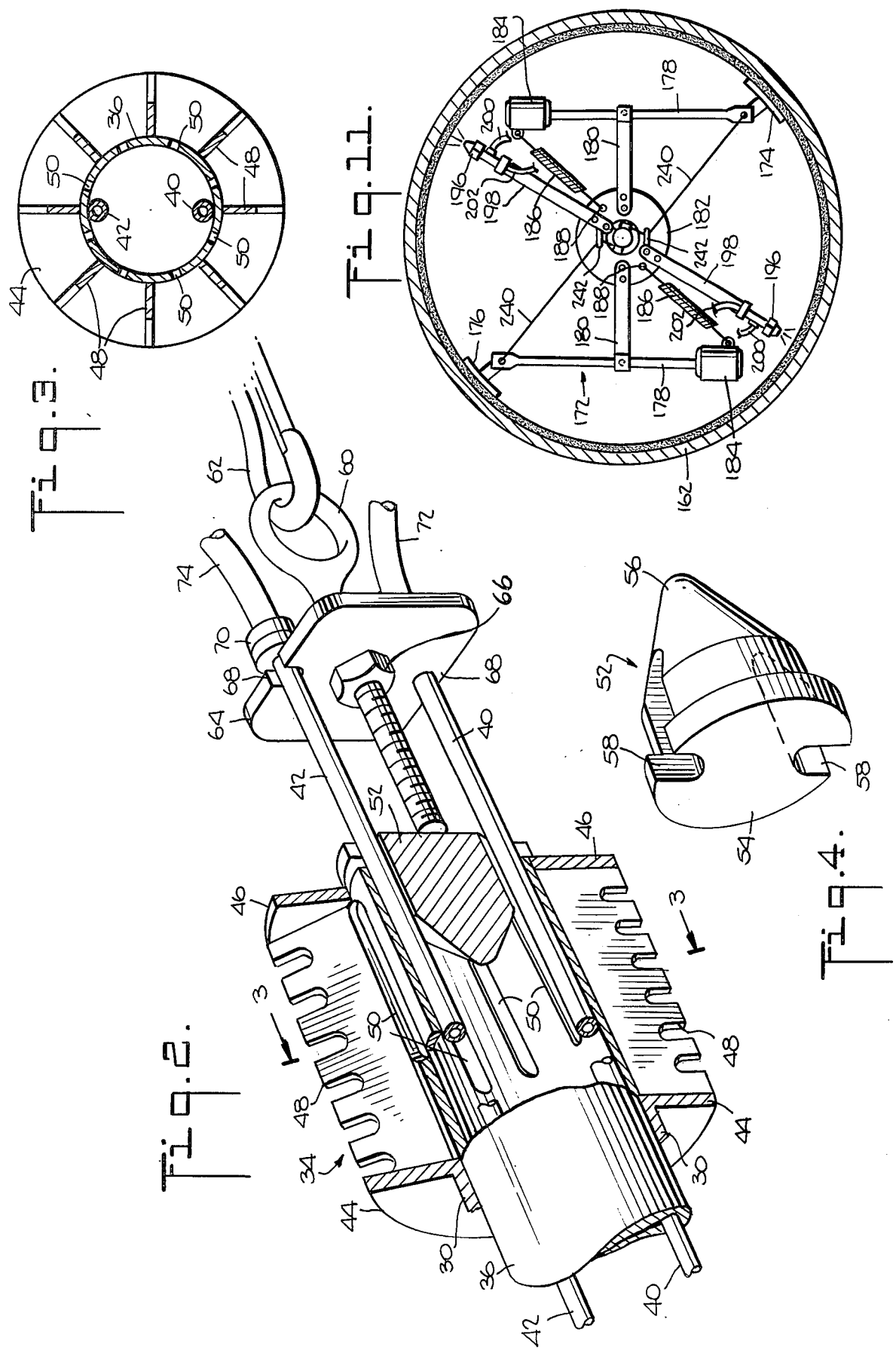

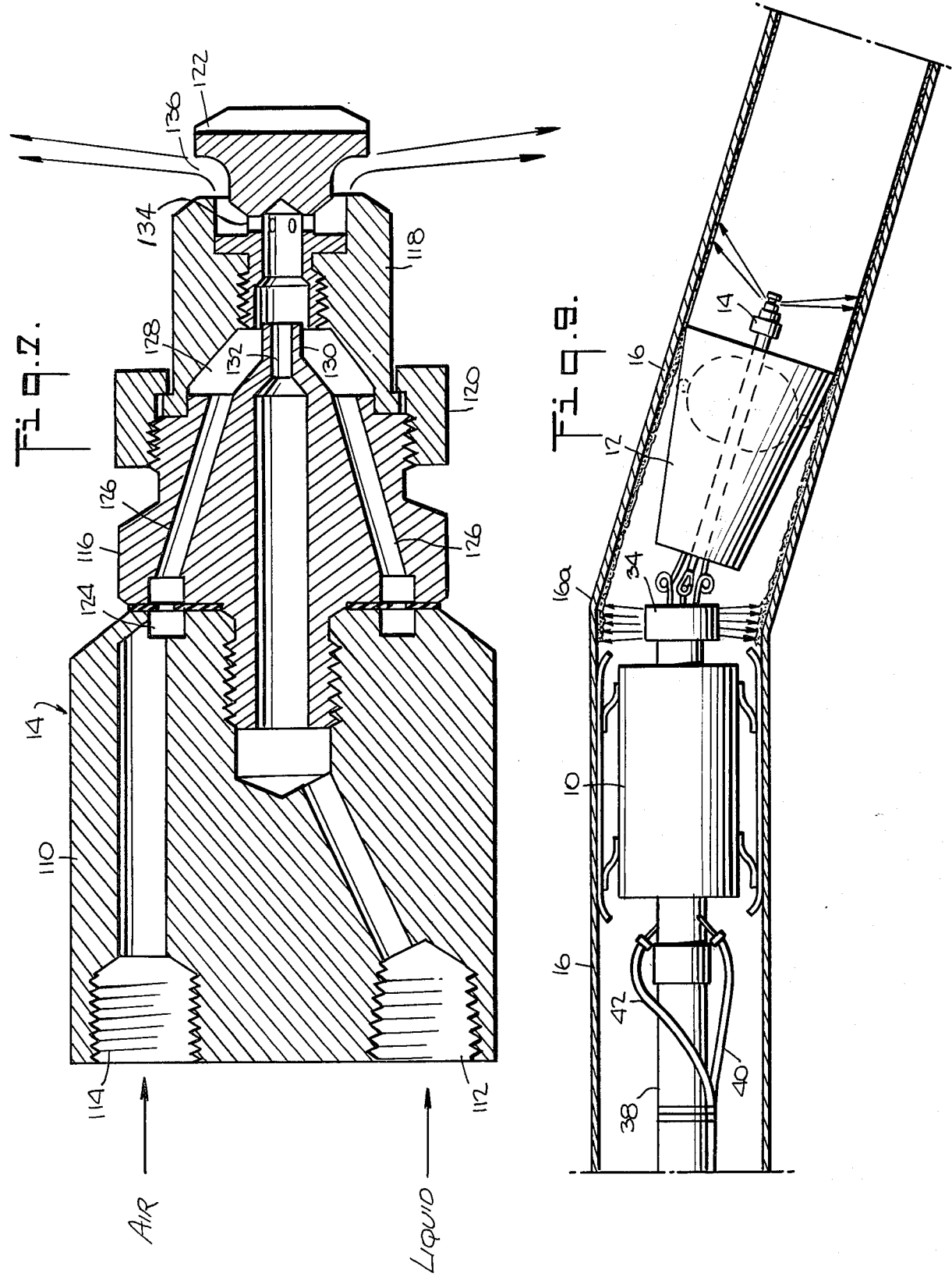

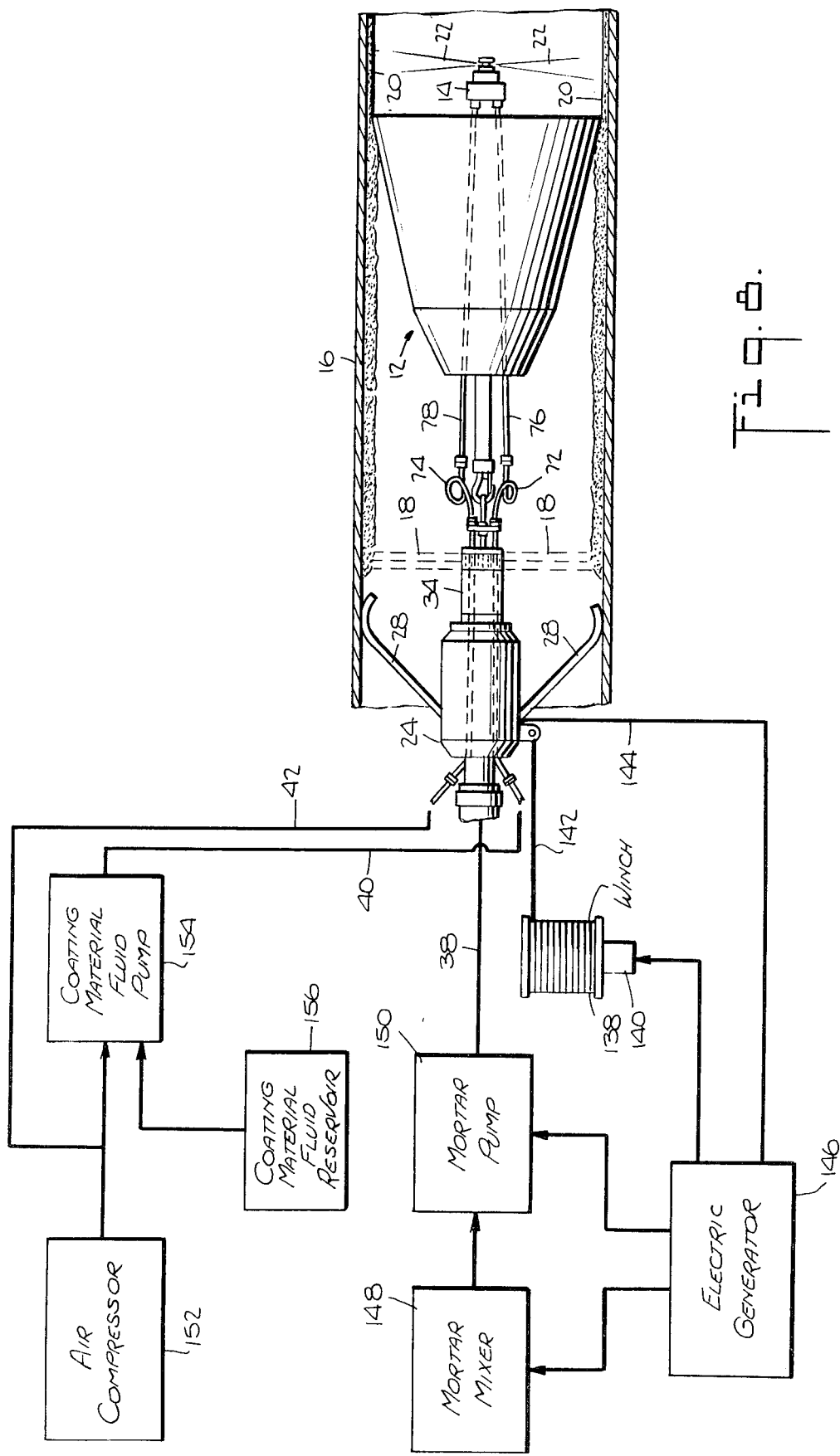

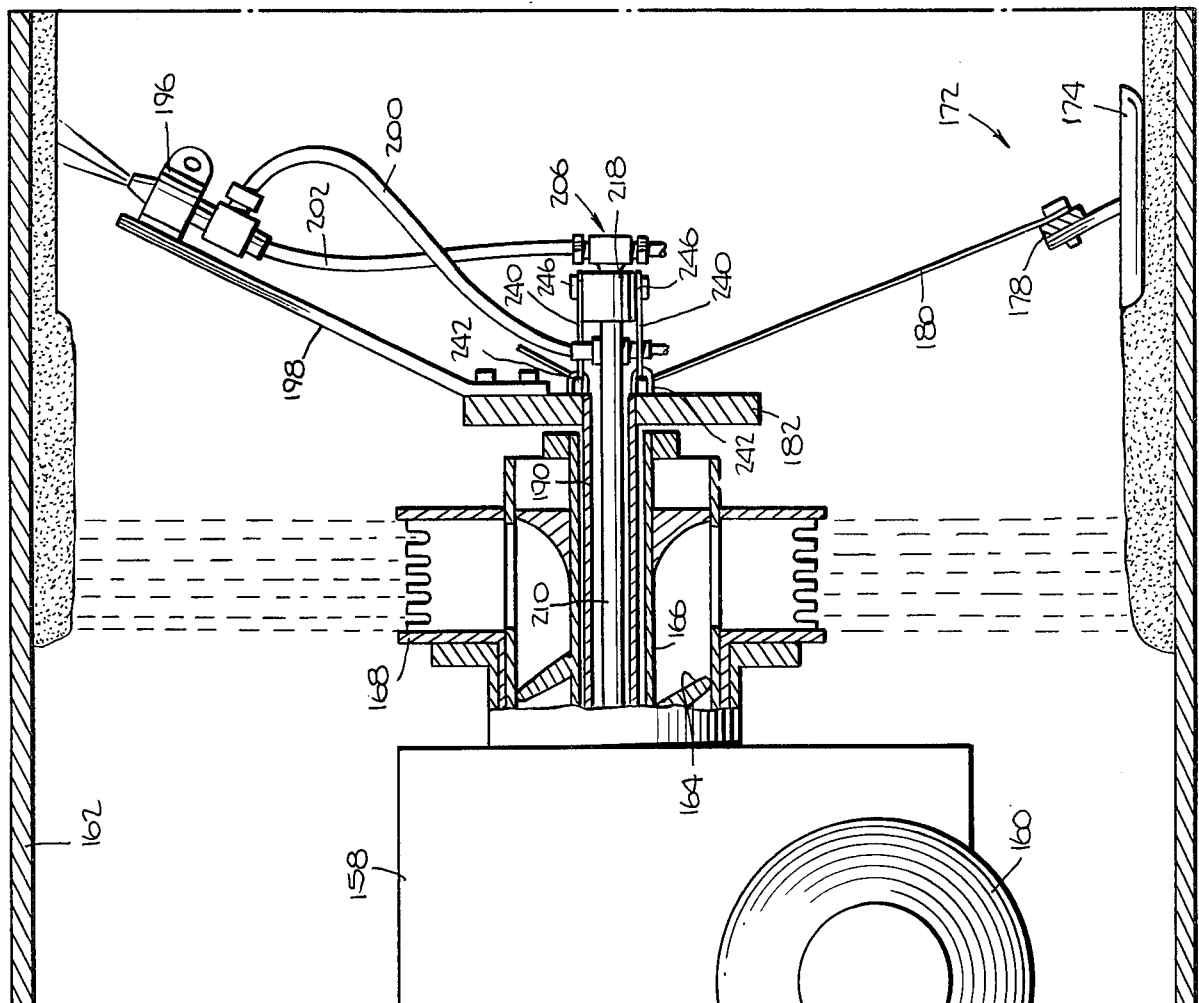
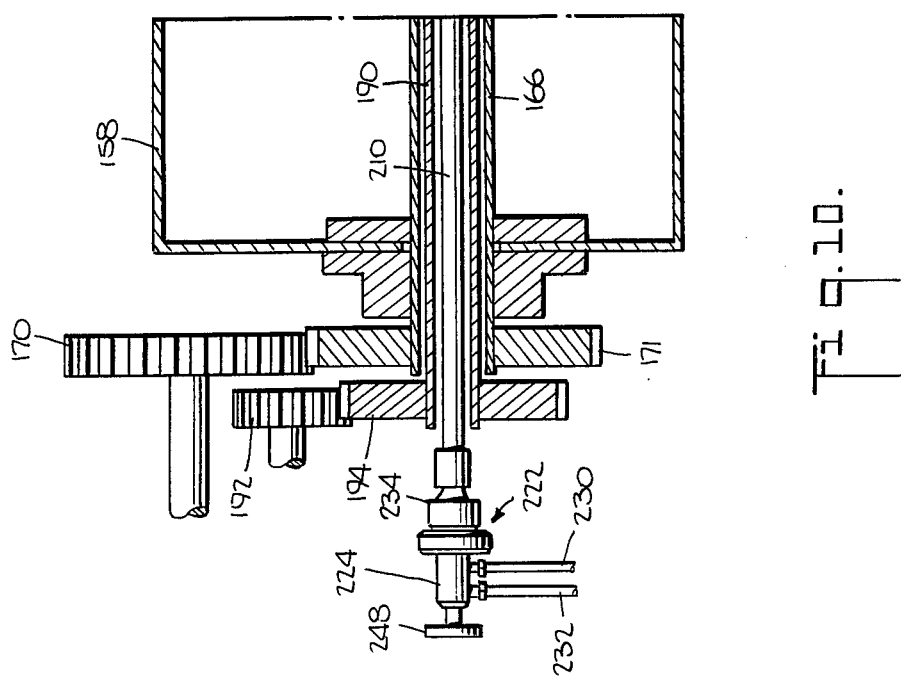
Fig. 10.

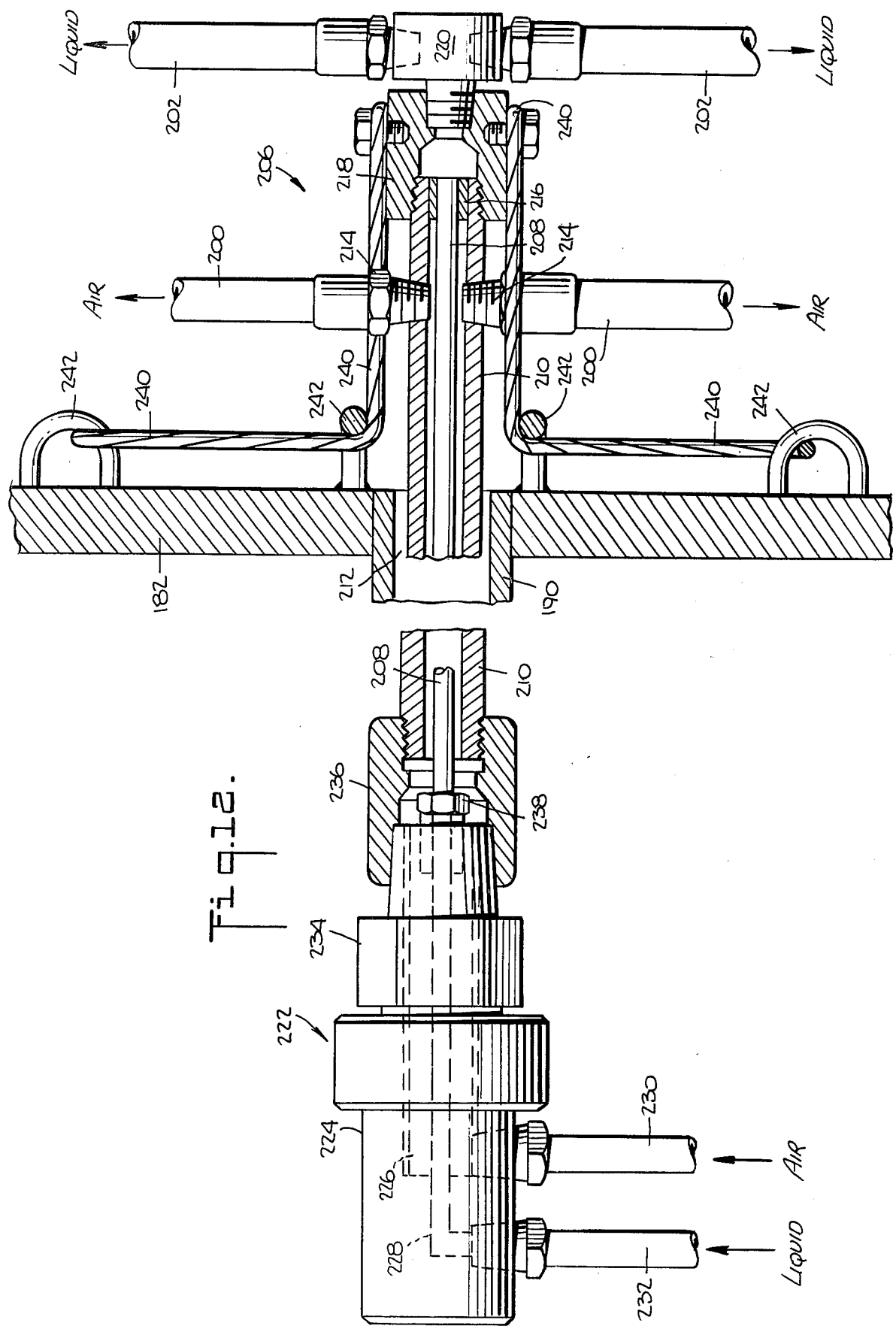

METHOD AND APPARATUS FOR CEMENT LINING OF PIPES

BACKGROUND OF THE INVENTION

1. Field of the Invention

This invention relates to the lining of pipes with a cement mortar and more particularly it concerns novel methods and apparatus for carrying out such lining.

2. Description of the Prior Art

U.S. Pat. Nos. 1,988,329 and 2,168,917 to A. G. Perkins illustrate arrangements for lining the interior of pipes with a cement mortar material. As shown in both those patents, a wet cement mortar is thrown centrifugally from a rotating distributor head out against the inner surface of the pipe. When properly applied, the mortar will adhere to the pipe surface until it hardens whereupon it forms a unitary, self supporting structure within the pipe. The Perkins patents also show rotating trowels mounted behind the distributor head to smooth the lining material before it hardens. Additionally, U.S. Pat. No. 1,988,329 shows a rotating spray head through which an asphaltum curing control liquid is pressure sprayed onto the freshly trowelled lining. U.S. Pat. No. 2,168,917 shows an alternative means for applying a curing control liquid, namely a second electrically driven centrifugal distributor head.

U.S. Pat. No. 3,069,093 H. C. Schultz illustrates a machine for lining relatively small diameter pipes. According to this patent, a single motor is used to drive both a cement mortar centrifugal distributor head and a curing control liquid centrifugal distributor head. The two distributor heads are located immediately adjacent each other but the blades on each head are canted in opposite directions so that their sprays do not overlap. The Schultz device does not use a trowel.

U.S. Pat. No. 3,920,363 to Henry A. Nelson Holland shows a pipe lining machine which includes a centrifugal distributor for depositing wet cement mortar onto the interior of a pipe and a non-rotating drag trowel which is pulled along behind the distributor. The Holland patent does not disclose the application of a curing control liquid.

It has been found that when a curing control liquid is properly applied to the surface of a pipe which has just been lined with a cement mortar, the resulting fully cured lining will have greater strength than in cases where no curing control liquid is used. This curing control liquid, which may be, for example, an asphaltum or a liquid bituminous material, forms a moisture barrier on the surface of the mortar and retards the escape of water from the mortar mix. As a result the mortar will cure fully and it will not shrink appreciably during the curing process. The resulting mortar lining therefore has maximum strength and it will remain in close fitting relationship with the surrounding pipe.

Past arrangements and techniques for applying a curing control liquid to a mortar lined pipe have not been satisfactory. One reason for this is that the freshly applied wet mortar does not strongly adhere to the pipe surface; and if the lining is disturbed to any substantial extent before it has taken its initial set and has begun to acquire structural strength of its own, it is likely to result in a "fall" wherein the entire mortar lining pulls away and falls to the bottom of the pipe. Cleanup problems in such case are formidable. Trowelling also disturbs the lining and renders it even more susceptible to a fall. Because of this it has not been recommended to apply a curing control liquid in the manner of the Perkins patents onto a freshly trowelled mortar lining since the force of the curing control liquid being sprayed or thrown against the lining substantially increased the likelihood of a fall.

Because of the foregoing difficulties, curing control liquids were either not used or they were applied only after the mortar lining has taken its initial set and had built up appreciable strength. In the latter case a man (in the case of large diameter pipe) or a machine (in the case of small diameter pipe) would go along inside the pipe and apply the curing control liquid to the partially cured lining. In the case of smaller diameter pipe, an air driven or atomized spray of curing control liquid was previously employed. However the spray nozzle and the liquid and air supply lines had to be supported centrally of the pipe by framework elements which were dragged over the still incompletely cured mortar. These latter techniques also presented difficulties because the curing control liquid was not applied until after the critical initial curing phase (usually twelve to eighteen hours after application). Also, after the initial curing phase, the mortar would cool and condensation would form on the mortar surface and this would often prevent adherence of the curing control liquid.

Another difficulty encountered with the prior art is that of providing a very thin but uniform coating of the curing control liquid on the cement mortar. In the above identified patents to Perkins the spray nozzles or centrifugal distributor for the curing control liquid was mounted on a supply tube which extended out from the mortar distributor head. Also, the mortar distributor head extended out behind the lining machine itself and the lining machine was centered in the pipe by means of wheels which rolled along inside the pipe. When the wheels encountered lateral deviations, e.g. from curves or irregularities inside the pipe the resulting shift of the lining machine axis was multiplied out at the spray nozzle or centrifugal distributor for the curing control liquid. This would result in a variation of the coating on different portions of the lining. This variation was particularly pronounced in small diameter pipes.

SUMMARY OF THE INVENTION

According to the present invention there are provided novel arrangements which enable one to apply a thin but uniform coating of a curing control liquid onto a freshly trowelled cement mortar lining in pipes of both large and small diameter. In one aspect, the invention involves the steps of centrifugally spraying wet cement mortar against the interior of a pipe, trowelling the wet cement mortar and, before the trowelled wet cement mortar begins to harden, applying an air atomized liquid spray of a curing control substance onto the trowelled surface of the wet cement mortar. An air atomized liquid spray is preferably obtained, according to the present invention, by providing an air line and a liquid line to extend centrally through a mortar distributor head and out beyond a trowel to an air atomizing nozzle. The air atomizing nozzle breaks the liquid into very small particles which provide a thin yet complete coating on the mortar. Further, the small liquid particles are carried by the atomizing air and thus do not disturb the fragile uncured mortar lining. Accordingly even though the adherence of the freshly trowelled lining to the interior of the pipe is very low, the danger of a lining fall as a result of the application of a curing control coating is minimized.

In another aspect, the invention involves the steps of distributing wet cement mortar onto the inner wall of a pipe by centrifugal action from a distributor head, pulling a trowel behind the distribution head over the mortar while allowing the trowel to move laterally in response to the configuration of the pipe at the location of the trowel and independently of the distribution head and spraying a curing control liquid onto the mortar from a spray nozzle while supporting the nozzle on the trowel at a location immediately therebehind. Also, according to the present invention, a drag trowel is pivotally connected to a lining material distributor head so that it moves laterally independently of the movements of the lining machine on which the distributor head is mounted. In addition, supply lines for the spray nozzle extend through the distributor head and are connected via flexible conduits, extending between the distributor head and the trowel, to spray nozzle lines supported on the trowel. These spray nozzle lines in turn are connected to the spray nozzle supported on the trowel. As the lining machine moves along the pipe and encounters lateral movements due to turns or irregularities in the pipe, these movements are not communicated to the curing control liquid spray nozzle which is located a substantial distance behind the distribution head. Instead, the spray nozzle is positioned by the trowel itself, which in turn is controlled laterally by the configuration of the pipe at the location of the trowel. Thus, at all times the spray nozzle is maintained at a predetermined distance from the freshly trowelled pipe surface, irrespective of variations in configuration of the pipe or lateral movements of the lining machine.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

BRIEF DESCRIPTION OF THE DRAWINGS

Selected embodiments of the invention have been chosen for purposes of illustration and description, and are shown in the accompanying drawings, forming a part of the specification, wherein:

FIG. 2 is an enlarged fragmentary perspective view, partially cut away, showing the interior of a base layer material distributor, coating material and atomizing air conduits and a pivotal trowel connection used in the pipe lining apparatus of FIG. 1;

FIG. 3 is a cross section view taken along line 3—3 of FIG. 2;

FIG. 4 is a perspective view of a plug used in the base layer material distributor of FIG. 2 (shown reversed with respect to FIG. 2);

FIG. 7 is a section view showing the construction of an air atomized liquid spray nozzle used in the pipe lining apparatus of FIG. 1;

FIG. 8 is a diagramatic view showing the power and material feed arrangements to the pipe lining apparatus of FIG. 4;

FIG. 9 is a further diagramatic view illustrating the use of the pipe lining apparatus of FIG. 1 for lining a pipe with bends;

FIG. 10 is an elevation view, partially broken away, of a pipe lining apparatus constituting a second embodiment of the present invention;

FIG. 11 is an end view taken along line 11—11 of FIG. 10; and

FIG. 12 is an enlarged side elevational view, partially in section and partially broken away, showing a nozzle liquid and air feed used in the embodiment of FIG. 10.

DETAILED DESCRIPTION OF THE PREFERRED EMBODIMENTS

Figure 1:
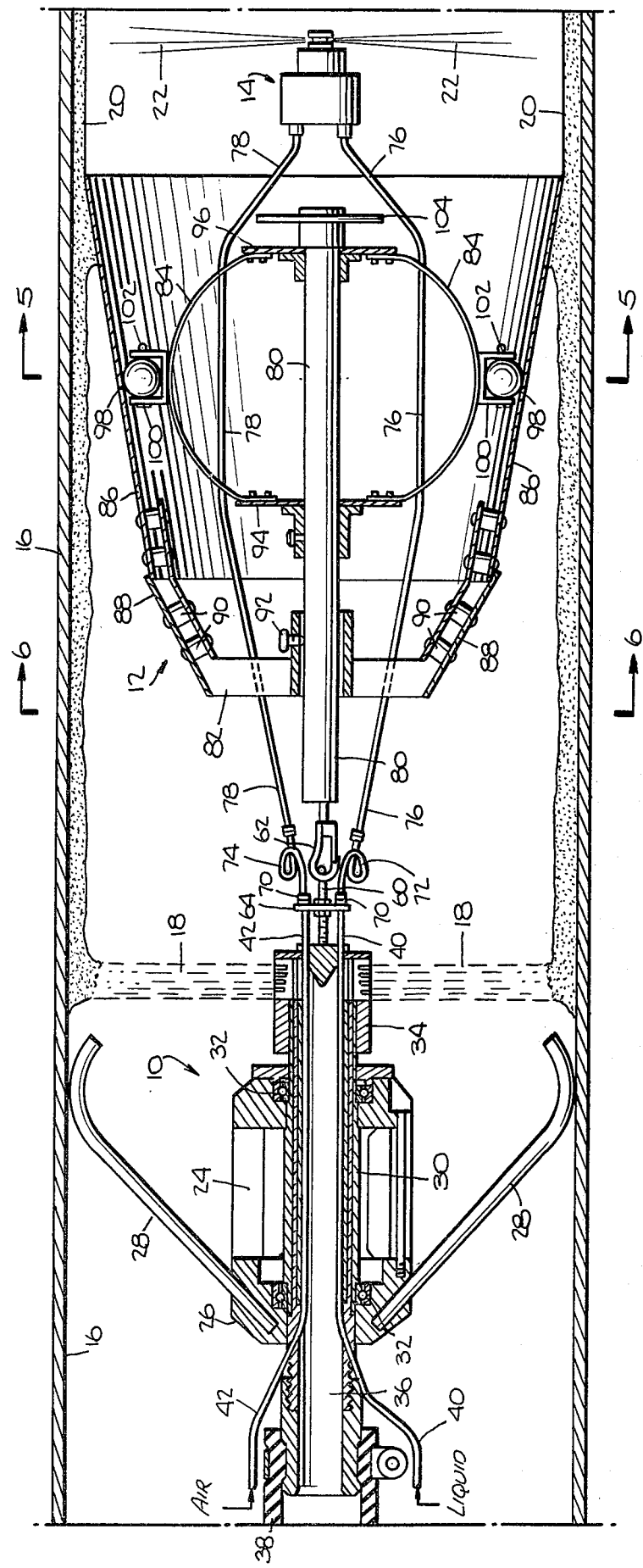
FIG. 1 is an elevation view, taken in section, of a pipe lining apparatus according to the present invention.

The lining machine of FIG. 1 comprises a lining material distributor 10, a drag trowel 12 and an air atomized liquid spray coating nozzle 14 arranged in a line. In use, the lining machine is pulled through the interior of a pipe 16 while the lining material distributor 10 sprays wet cement mortar 18 by centrifugal action against the interior of the pipe. The drag trowel 12 follows along behind the distributor 10 to trowel the mortar and form a smooth mortar lining 20. The coating nozzle 14 then applies an air atomized spray 22 of a curing control liquid onto the surface of the freshly trowelled mortar lining 20. The coating formed by the spray 22 acts as a seal to prevent water from being driven out of the wet cement mortar mix during curing. The heat of reaction during curing of the mortar tends to drive water out of the mortar mix; and if this is not prevented, or at least retarded, there will not be sufficient water available for complete curing. Also, if water is driven out too fast the mortar may shrink and pull away from the inner wall of the pipe. The curing control liquid, which may be a bituminous or asphaltum material, forms a film over the mortar surface and retards the passage of water out of the mortar.

The lining material distributor 10 includes an electric motor 24 having an outer stator casing 26 from which guide rods 28 extend in spider-like fashion to slide against the inner surface of the pipe 16. The guide rods 28 slide along the interior of the pipe and maintain the motor 24 centered along the pipe axis. The motor 24 has a hollow armature 30 which is mounted inside the casing 26 by means of bearings 32. The armature 30 extends out in cantilever fashion behind the motor casing 26 and supports a centrifugal distributor head 34. During operation of the motor 24 the distributor head 34 spins; and wet cement mortar, which is supplied through the hollow armature 30, is thrown centrifugally in all radial directions by the distributor to create the wet cement mortar spray 18.

A mortar feed conduit 36 is mounted to the front end of the motor casing 26. This conduit extends through the armature 30 and through the distributor head 34. A mortar supply conduit 38 is connected to the foward end of the feed conduit 36. This later conduit extends through the pipe 16 to an external mortar source and pump (not shown).

A liquid coating supply conduit 40 and an air supply conduit 42 extend alongside the mortar supply conduit 38 inside the pipe 16. These later conduits are connected to remote sources of liquid coating and pressurized air (not shown). As can be seen in FIG. 1 the liquid and air supply conduits 40 and 42 pass through the wall of the mortar feed conduit near the forward end of the motor 24; and they extend inside th motor feed conduit, past the motor 24 and the distributor head 34.

FIGS. 2-4 illustrate the manner in which the liquid and air supply conduits 40 and 42 are arranged in conjunction with the mortar feed conduit 36 in the vicinity of the distributor head 34. As can be seen in FIGS. 2 and 3, the mortar feed conduit 36, which does not rotate, extends along inside the distributor head 34. As indicated above, the distributor head 34 is connected to and is rotated by the hollow motor armature 30. The distributor head 34 is made up of end flanges 44 and 46 arranged on opposite edges of radially extending, circumferentially distributed notched vanes 48. The forwardmost flange 44 is connected to the motor armature 30 so that the flanges and vanes are spun around by the motor armature. Wet cement mortar is fed from the mortar feed conduit 36 out through slots 50 and into the spaces between the vanes 48 of the distributor head. The spinning vanes 48 throw the mortar centrifugally outward in a uniform spray against the inner wall of the pipe 16.

The rearward end of the mortar feed conduit 34 is closed by means of a tapered plug 52. The tapered plug extends part way into the mortar feed conduit and its tapered shape serves to distribute the wet mortar evenly to the various slots 50.

FIG. 4 shows the configuration of the plug 52. The plug 52 is shown reversed in FIG. 4 (with respect to its position in FIG. 2) in order that its configuration can be seen more easily. As shown, the plug 52 includes a flange like end wall 54 which closes the rearward end of the mortar feed conduit 34 and a tapered nose portion 56 which protrudes into the conduit 34 for even distribution of mortar to the feed slots 50. The plug 54 is provided with a pair of longitudinal notches 58 in its periphery and these notches, as shown in FIG. 2 serve to accommodate the liquid and air supply conduits 40 and 42. These later conduits are sealed to the notches 58 so that the wet cement mortar inside the mortar feed conduit 34 cannot escape except through the slots 50.

The drag trowel 12, as shown in FIG. 1 is pivotally connected at its forward end to the distributor head 34. This pivotal connection is also shown in FIG. 2. As there shown, an eye bolt 60 is threaded into the flange end of the plug 54; and a snap hook 62, at the forward end of the trowel 12, is connected to the eye portion of the eye bolt 60. A conduit support flange 64 is mounted on the eye bolt 60 and is secured in place by means of lock nuts 66. The flange 64 is also provided with peripheral notches 68 which accommodate the liquid and air supply conduits 40 and 42. These latter conduits are connected by means of disconnect couplings 70 located in the vicinity of the support flange 64, to flexible segments 72 and 74. As shown in FIG. 1 the flexible segments 72 and 74 extend along the region of the eye bolt 60 and snap hook 62. At a short distance past the snap hook 62 the flexible segments are connected to rigid liquid and air conduit extensions 76 and 78 which pass through the drag trowel 12 to the coating nozzle 14.

The drag trowel 12, as shown in FIG. 1, is made up of an axial rod 80, a forwardly positioned support frame comprising a spider 82 and leaf bias springs 84. A plurality of partially overlapping sheet metal trowel leaves 86 are attached at their forward ends by means of straps 88 and spacers 90 to the spider 82 and they flare outwardly behind the spider. The straps 88 allow the rearward ends of the leaves to move radially outwardly toward the inner surface of the pipe 16.

The spider 82 fits around the rod 80 and is secured to the rod by means of a setscrew 92.

Figure 5:
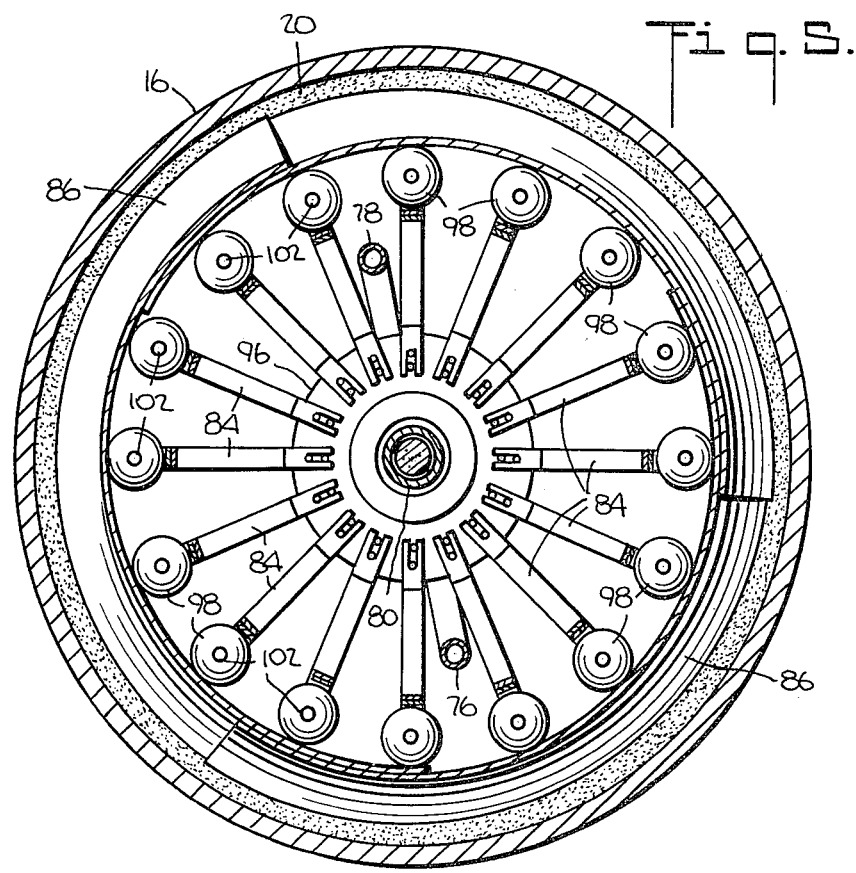
FIG. 5 is an enlarged cross section view taken along line 5—5 of FIG. 1.

The leaf bias springs 84 are of V-shaped configuration and their ends are connected to forward and rearward disks 94 and 96 mounted on the axial rod 80. As can be seen in FIG. 5 the leaf bias springs 84 are arranged in radial array around the disks 94 and 96. An anti-friction ball 98 is provided at the base or outermost extent of each spring 84 and is held to the spring by means of a bracket 100. A pin 102 extends through the bracket and the ball 98 so that the ball can rotate freely about an axis substantially parallel with the trowel axis. As can be seen, the bias springs 84 urge the balls 98 out against the leaves 86 so as to force the rearward edges of the leaves out against the lining material deposited by the distributor head 34. The force of the bias springs may be adjusted by turning an adjustment handle 104 located beyond the end of the axial rod 80 outside the rearward disk 96. This adjustment handle turns a threaded rod (not shown) which extends through the disk 96 and is threaded into the axial rod 80 between the disks. When the handle 104 is turned in one direction the disks 94 and 96 are brought closer together and the V-shaped bias springs are flexed so that the balls 98 push the trowel leaves 96 outwardly with greater force. When the handle 104 is turned in the opposite direction the spring bias force on the trowel leaves is correspondingly decreased.

Figure 6:
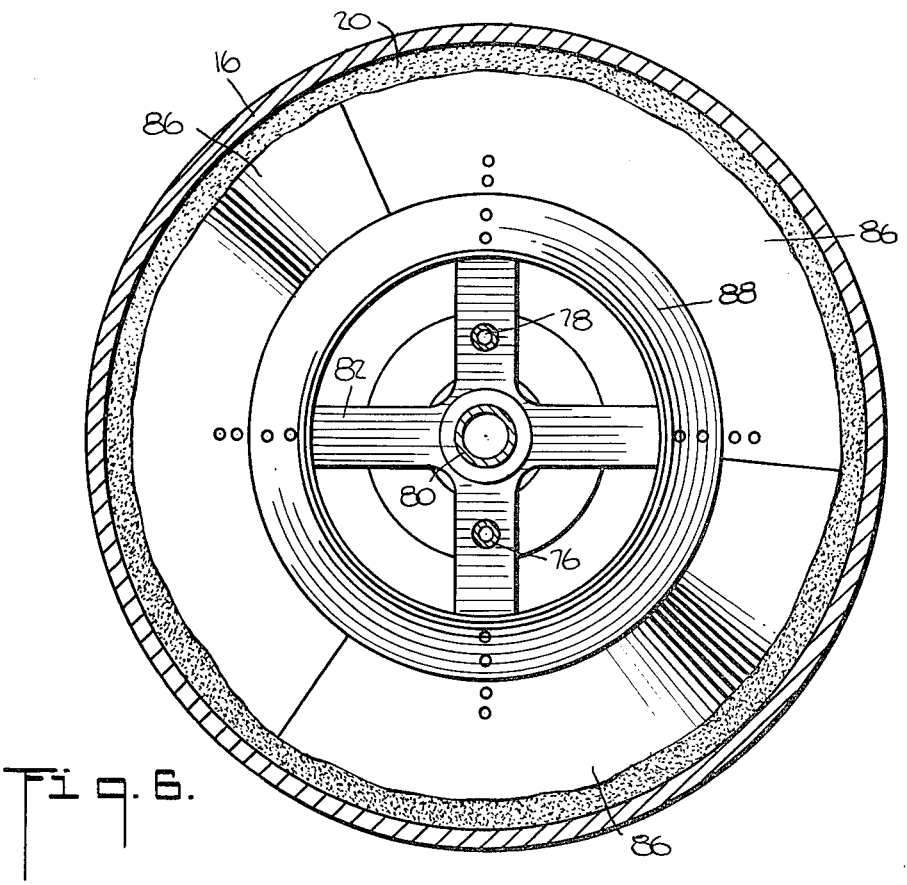
FIG. 6 is an enlarged cross section view taken along line 6—6 of FIG. 1.

As can be seen in FIG. 6 the liquid and air conduit extensions 76 and 78 extend through openings in two of the arms of the spider 82 and these extensions extend rearwardly, cantilever style from the spider. The conduit extensions 76 and 78 pass between pairs of the leaf springs 84 and they come together at the coating nozzle 14 to support the nozzle in cantilever fashion along the longitudinal axis of the trowel near the rear edge of the trowel leaves.

The coating nozzle 14 is essentially an air atomizing liquid spray device of the type used in spray painting. FIG. 7 shows the structural configuration of the nozzle. As can be seen, the nozzle 14 comprises a base block 110 having liquid and air input openings 112 and 114 to which, respectively, the liquid and air conduit extensions 76 and 78 are connected. An intermediate block 116 is threaded to the base block 110 and a nozzle block 118 is held to the rear of the intermediate block by means of a threaded collar 120. A spray tip 122 is threaded into the rear of the nozzle block 118.

The air input opening 112 in the base block 110 leads to an annular chamber 124 formed between the base and intermediate blocks 110 and 116. The annular chamber 124 in turn communicates via a plurality of circumferentially distributed converging passageways 126 to a conical mixing chamber 128 in the nozzle block 118.

The inner portion of the spray tip 122 cooperates with a projection 130 in the mixing chamber 128 to form a venturi whereby pressurized air from the mixing chamber 128 passes at high velocity over the projection 130 and entrains liquid from a central passageway 132. The entrained liquid is broken up into very fine droplets and is mixed with the fast moving air. This air and liquid mixture then passes through openings 134 in the spray tip 122 and from there it is distributed as a 360° radial or conical spray through an annular slot 136. The fineness of this spray and its intensity can be controlled by suitable control of the applied air and liquid pressures.

FIG. 8 shows in diagramatic form the arrangements for providing power and material feed to the pipe lining apparatus of FIG. 1. As can be seen in FIG. 8 the entire apparatus is pulled through the pipe 16 by means of a winch 138 which is driven by a winch motor 140. A cable 142 extends from the lining apparatus motor 24 to the winch 138. The pipe lining apparatus motor 24 is connected via an electrical cable 144, to an electrical generator 146. The generator 146 also supplies electrical power to the winch motor 140, to a mortar mixer 148 and to a mortar pump 150. Semi-liquid cement mortar is mixed in the mortar mixer 148 and is then pumped by the mortar pump 150 through the mortar supply conduit 38.

An air compressor 152 is provided to supply compressed air via the air supply conduit 42, the flexible segment 74 and the rigid air conduit extension 78 to the coating nozzle 14. The air compressor 152 is also connected to drive a coating material pump 154. The coating material pump operates to pump liquid coating material from a coating material reservoir 156 via the liquid supply conduit 40, the flexible segment 72 and the rigid liquid conduit extension 76 to the coating nozzle 14. The liquid coating material is a liquid bituminous or asphalt material capable of adding to the wet mortar surface and forming a film over the surface to retard the escape of water.

During operation of the pipe lining apparatus the winch 138 and the winch motor 140 as well as the electric generator 146, the mortar mixer and mortar pump 148 and 150, the air compressor 152, the coating material pump 154 and the coating material reservoir 156 are all located outside the pipe 16 being lined near one end of the pipe. The lining apparatus is positioned near the opposite end of the pipe; and the winch cable 142, the electrical cable 146, the mortar supply conduit 38, and the liquid and air supply conduits 40 and 42 are each brought through the pipe 16 from their respective power and material supply sources to the lining apparatus.

During the pipe lining operation the winch 138 is operated to pull the lining apparatus slowly through the pipe to be lined. At the same time semi-liquid mortar is pumped through the mortar supply conduit 38 while coating material and air are supplied via the liquid and air supply conduits 40 and 42 respectively, and electrical power is supplied via the electrical cable 146 to the electric motor 24. These conduits and electrical cable are taken up by means (not shown) at the winch end of the pipe 16 as the lining apparatus is pulled through the pipe; and during this time mortar, coating liquid and compressed air, and electrical power are supplied to the lining machine. As the lining machine is thus pulled through the pipe 16, the electric motor 24 spins the vanes 48 of the distributor head 34 and the mortar which passes outwardly through the slots 50 in the distributor is thrown centrifugally outwardly by the vanes. This produces a radial spray in all directions and deposits the mortar about the interior of the pipe 16.

At the same time, the drag trowel 12, which follows the distributor head 34 slides along the deposited mortar and forms it into the smooth mortar lining 20.

The pressurized air and coating liquid, which are supplied along the liquid and air supply conduits 40 and 42, are directed into the coating nozzle 14 where the air is used to atomize the liquid and blow the atomized liquid, as a mist, onto the trowelled mortar lining 20. This fine mist provides a thin yet complete coating of the liquid over the trowelled mortar lining and the coating forms a film which retards the passage of moisture and thereby enhances the curing of the mortar.

The coating material pump 154 is operated only with sufficient pressure to convey the coating material liquid from the reservoir 156 to the nozzle 14. The air compressor 152, however, is operated to supply sufficient air pressure at the nozzle 14 to atomize the liquid coating material and to blow it against the trowelled lining surface. Thus the likelihood of leakage of the coating material liquid is minimized.

The mortar lining 20, in its initially trowelled semiliquid condition, is not strongly held to the inner surface of the pipe 16. Moreover, since this fresh lining possesses no intrinsic structural strength prior to initial hardening, it is important that no undue disturbances be created in the vicinity of the lining otherwise it will fall away from the pipe. The atomized spray of the liquid coating material, however, does not disturb the lining material and it may be applied to the lining without substantial danger of a fall. This is different from the situation where, as in the prior art arrangements described above, the liquid coating is thrown by centrifugal action or is sprayed by direct pressure against the mortar lining. In both these prior art situations the liquid particle size is relatively large and the liquid particles are thrown with such force that their impact against the trowelled mortar lining is liable to disturb it to such an extent that it will fall. In the present invention the atomized spray provides smaller particles than could be obtained by centrifugal or pressure spray distributors and the atomizing spray is not carried with sufficient force to disturb the fresh mortar lining.

It will be noted that the coating nozzle 14 is held in cantilever fashion by the rigid liquid and air conduit extensions 76 and 78 and that these in turn are held in the forward support spider 82 of the drag trowel 12. It will also be noted that the conduit extensions 76 and 78 are connected, via the flexible segments 72 and 74 in the vicinity of the pivotal trowel to lining distributor coupling, to the air and liquid supply conduits 40 and 42. Thus the coating nozzle 14 is free to move laterally with respect to the distributor head 34 so that it is positioned not by the lining material distributor 10 but rather by the drag trowel 12.

The significance of this special coating nozzle support arrangement can be appreciated from FIG. 9 where the lining apparatus is shown negotiating a bend 16a in the pipe 16. As can be seen, the coating nozzle 14 is maintained by the drag trowel 12 precisely centered in the portion of the pipe 16 where it is spraying. Because of this an even coating is provided about the entire pipe circumference irrespective of the position and orientation of the lining material distributor 10. In prior art spray coating arrangements, where the spray coating distributor was mounted to extend out from the lining material distributor, the spray coating distributor would be swung laterally by the lining material distributor as the latter negotiated turns and bends in the pipe. As a result the spray coating nozzle was not maintained at a uniform distance from the mortar lining and an uneven coating would occur. In the case of the present invention on the other hand, the coating nozzle 14 is supported by the trowel 12 itself and is therefore always maintained centered in the pipe at a fixed distance from the surface of the troweled lining material.

FIGS. 10-12 show an embodiment of one aspect of the invention which is suited for the lining and spray coating of larger diameter pipes, e.g., larger than thirty inches (0.75 meters). In the case of large diameter pipes the changes in orientation of the lining material distributor, as it negotiates turns and bends in the pipe, are small relative to the diameter of the pipe. Therefore the trowelling mechanism and the spray coating device may both be fixedly mounted onto the lining material distributor and will not be swung off center to any appreciable degree when the lining machine encounters turns or bends.

The lining machine in FIG. 10 is similar to that shown in U.S. Pat. No. 3,810,441. The lining machine comprises a main body 158 having support wheels 160 which ride along inside a large diameter pipe 162 to be lined. The lining machine may be pulled through the pipe 162 by external winch means (not shown) as in the previous embodiment or the wheels 160 may be driven to move the machine through the pipe. The body 158 incorporates a hopper into which wet mortar is kept in a state of continuous agitation. The mortar is conveyed forwardly from the hopper by means of a screw conveyor 164 having a hollow tubular core 166. The screw conveyor forces the cement mortar forwardly to the interior of a centrifugal distributor head 168 which is similar in construction and operation to the distributor head 34 of the preceding embodiment. Suitable electrical motor drive means (not shown) is provided inside the lining machine to spin the distributor head 168. Also a conveyor drive gear 170 is arranged outside the main body 158 to turn a pinion 171 on the conveyor core 166 and operate the conveyor 164.

A rotating trowel 172 is mounted to extend out behind the distributor head 168. The trowel 172, as shown in FIGS. 10 and 11, comprises a pair of trowel shoes 174 and 176 pivotally mounted on support rods 178. These support rods in turn are pivotally connected, at their mid-section, to trowel support brackets 180 which extend out from a circular plate 182. Counterweights 184 are provided on the ends of the support rods 178 at the end thereof opposite from the trowel shoes 174 and 176. In addition, bias tension springs 186 extend from fixed anchors 188 on the circular plate 182 to the counterweights 184. These springs pull inwardly on the counterweight ends of the rods 178 and thus bias the trowel shoes 174 and 176 outwardly against the inside of the pipe 162 being lined.

Referring again to FIG. 10 it can be seen that the circular plate 182 is positioned slightly behind and coaxially with the distributor head 168. The plate 182 is mounted on the end of a trowel drive tube 190 which extends back inside the distributor head and through the hollow tubular core 166 of the screw conveyor 164. A trowel drive gear 192 is arranged outside the main body 158 to turn a pinion 194 on the trowel drive tube 190 to turn the tube and the circular plate 182, and in this manner to rotate the trowel shoes 174 and 176 inside the pipe 162. Suitable drive means (not shown) are provided to turn the conveyor drive gear 170 and the trowel drive gear 192.

As can also be seen in FIGS. 10 and 11 there are provided a pair of air atomizing coating liquid spray nozzles 196 which are mounted on brackets 198 and oriented to direct air atomized liquid sprays out behind the trowel shoes 174 and 176 and against the freshly trowelled mortar lining inside the pipe 162. The brackets 198 in turn are mounted on the circular plate 182 and accordingly the nozzles 196 are carried around with the trowel shoes to spray evenly against the entire surface of the lining. The nozzles 196 may be similar in construction to those shown in FIG. 7 although because they are carried around the interior of the pipe 162 they need not produce a radial or hollow conical spray pattern. Instead the nozzles 196 may be suitably modified to produce a flat spray pattern or any other configuration which will assure an even and complete coating of the trowelled mortar lining.

Flexible air and liquid supply conduits 200 and 202 extend from a coating distributor head 206 located just behind the circular plate 182, out to the nozzles 196. The construction and arrangement of the coating distributor head 206 is shown in FIG. 12. As can be seen the coating distributor head 206 comprises a centrally positioned common curing control liquid supply tube 208 and an outer, common, air supply tube 210 coaxially arranged and extending together through a central opening 212 in the circular plate 182. Air fittings 214 extend through the sides of the outer air supply tube 210 between the plate 182 and the rearward end of the tube; and these air fittings are connected to the flexible air supply conduits 200. A bushing 216 is provided in the space between the tubes 208 and 210 at their outer end and an end cap 218 is threaded over the outer end of the outer tube 210. A Tee fitting 220 is threaded into the end cap 218 and the flexible liquid supply conduits 202 are connected to this fitting. It will be seen that liquid coating material supplied through the central liquid supply tube 208 will pass through the end cap 218 and the Tee fitting 220 to the flexible liquid supply conduits 202 and from there to the nozzles 196. Also, air which is supplied through the annular space between the tubes 208 and 210 is directed out through the air fittings 214 and the flexible air supply conduits 200 to the nozzles 196.

The air supply tube 210, as shown in FIG. 10, extends through the interior of the trowel drive tube 190 to a rotary fitting 222 behind the main body 158. The rotary fitting 222 as shown in FIG. 12, comprises a stator housing 224 containing an annular air passage 226 and a central liquid passage 228 to which air and liquid supply lines 230 and 232 are connected. A rotor 234 having a rotary seal is connected to the stator and this rotor is also formed with annular air and central liquid passageways which communicate with the passageways 226 and 228 of the stator. The air supply tube 210 is threaded into an outer fitting 236 on the rotor and the central liquid supply tube 208 is connected via an inner fitting 238 to the central liquid passageway in the rotor 234. This arrangement permits the liquid and air supply tubes 208 and 210 to rotate with the trowel drive tube 190.

As can be seen in FIGS. 10 and 11, the trowel shoes 174 and 176 have retraction cables 240 connected to them. These retraction cables extend through eyes 242 mounted on the circular plate 182 to mounting lugs 246 on the end cap 218. When the liquid and air supply tubes 208 and 210 are pushed forwardly the lugs 246 pull on the cables 240 and the cables in turn pull on the trowel shoes 174 and 176 to retract them from the surface of the pipe 162. This enables the lining machine to be inserted in the pipe. When the machine is in place the liquid air supply tubes are retracted or pulled forwardly (i.e. in the same direction as that of movement of the lining machine through the pipe). This releases the cables 240 and allows the springs 186 to pull the trowel shoes against the inner surface of the pipe being lined. It will be appreciated that this arrangement permits control of trowel retraction by an operator located at the forward end of the lining machine and that in this arrangement the air supply tube 210 performs a dual function of conveying air to the nozzles 196 and of retracting the trowels. A handle 248 may be provided on the stator housing 224, as shown in FIG. 10, to facilitate movement of the air supply tube.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. A method of lining a pipe with cement mortar, said method comprising the steps of centrifugally spraying a wet cement mortar against the interior of the pipe, trowelling the wet cement mortar and, before the trowelled wet cement mortar begins to harden, supplying liquid coating material and compressed air to an air atomizing spray nozzle to produce an air atomized liquid spray, said liquid being of the type which forms a moisture barrier on the surface of the mortar, and applying the air atomized liquid spray onto the trowelled surface of said wet cement mortar to form said moisture barrier on said surface.

2. A method according to claim 1 wherein said air atomizing spray nozzle is supported on a trowel.

3. A method according to claim 2 wherein a lining material distributor is moved through said pipe to spray said wet cement mortar against the interior of the pipe and wherein said trowel is pulled through said pipe behind said lining material distributor.

4. A method according to claim 3 wherein said liquid coating material and said compressed air are conveyed through the center of said lining material distributor and through said trowel to said spray nozzle.

5. A method according to claim 1 wherein said liquid coating material is maintained at a pressure just sufficient to convey it to said nozzle and wherein said compressed air is maintained at a pressure sufficient both to atomize the liquid in said nozzle and to blow the atomized liquid against the surface of said wet mortar.

6. A method according to claim 1 wherein said spray nozzle is maintained at a fixed distance from the surface of said wet mortar as said nozzle is moved through said pipe.

7. Apparatus for lining a pipe with a cement mortar lining, said apparatus comprising a centrifugal distributor head, a support for said head and constructed to move along against the inner wall of a pipe to be lined and to support said head centrally of the pipe, a trowel mounted behind the distributor head to be pulled along therebehind and to trowel mortar applied to the interior of said pipe, an air atomizing spray nozzle mounted to spray out behind said trowel onto the trowelled mortar lining in the pipe and means for supplying pressurized air and a moisture barrier forming liquid to said spray nozzle.

8. Apparatus according to claim 7 wherein said spray nozzle is mounted on said trowel.

9. Apparatus according to claim 7 wherein said trowel is a drag trowel with overlapping leaves flaring rearwardly in conical configuration from a forward support and wherein said spray nozzle is mounted on said forward support to spray outwardly behind said leaves.

10. Apparatus according to claim 9 wherein said air and liquid supply means are rigid lines and wherein said spray nozzle is supported in cantilever fashion on its air and liquid supply lines at a location axially of said trowel and near the rearward edge of said leaves.

11. Apparatus according to claim 10 wherein said trowel is pivotally connected to said distributor head to be pulled along behind it and wherein flexible sections are interposed along said air and liquid supply lines between said distributor head and said trowel.

12. Apparatus according to claim 7 wherein said spray nozzle is configured to produce a radially directed spray pattern against the entire circumference of the trowelled mortar lining.

13. Apparatus according to claim 7 wherein said trowel is a rotating type trowel with a plurality of shoes which revolve about a central axis and wherein plural air atomized spray nozzles are arranged on said trowel to rotate with said shoes.

14. Apparatus according to claim 13 wherein a common liquid supply line and a common air line extend through the center of said trowel and are connected, respectively, to plural branch lines extending to each of said nozzles.

15. A method for lining a pipe with cement mortar, said method comprising the steps of distributing wet cement mortar onto the inner wall of said pipe by centrifugal action from a distributor head while moving the head through the pipe, pulling a trowel which is pivotally connected to and positioned behind said distributor head over the thus distributed mortar lining to smooth same while allowing relative lateral movement between the trowel and the distributor head as said distribution head and trowel successively negotiate bends in the pipe, and spraying a moisture barrier forming liquid onto the smoothed mortar lining from a spray nozzle while supporting said nozzle on said trowel at a location immediately therebehind, whereby the nozzle is maintained at all times at substantially the same distance from the trowelled surface of said mortar lining.

16. A method according to claim 15 wherein said nozzle is maintained substantially along the longitudinal axis of the trowel.

17. A method according to claim 16 wherein said nozzle is constructed to produce a radially directed spray pattern to distribute the liquid evenly over the surface of said mortar lining.

18. A method according to claim 15 wherein said liquid is conveyed through the interior of said distributor head, through a flexible fluid conduit between said distributor head and said trowel and through said trowel to said nozzle.

19. A method according to claim 18 wherein said nozzle is of the air atomizing type and wherein pressurized atomizing air is conveyed through the interior of said distributor head, through a second flexible fluid conduit between said distributor head and said trowel and through said trowel to said nozzle.

20. Apparatus for lining a pipe with cement mortar, said apparatus comprising a centrifugal distributor head, a support for said head and constructed to move along against the inner wall of a pipe to be lined and to support said head centrally of the pipe, a drag trowel for engaging and smoothing mortar applied to the interior of said pipe from said distributor head, means pivotally coupling said drag trowel and said distributor head so that said drag trowel will be pulled along through a pipe behind said distributor head and so that the trowel will be free to move laterally with respect to said distributor head when said distributor head and trowel successively negotiate bends in the pipe, a spray nozzle for spraying a moisture barrier forming liquid onto mortar smoothed by said trowel, and mounting means on said trowel for mounting said spray nozzle at a location immediately behind said trowel so that the nozzle is maintained at a predetermined distance from the trowelled surface of the mortar along the entire length of the pipe.

21. Apparatus according to claim 20 wherein said spray nozzle is provided with supply conduit means for supplying said nozzle with fluids to be sprayed, said supply conduit means extending through the center of said distributor head and said trowel and including a flexible section in the region of said pivotal coupling.

22. Apparatus according to claim 21 wherein said supply conduit means is rigid in the region of said trowel and wherein said spray nozzle is supported in cantilever fashion on said supply conduit means.

23. Apparatus according to claim 22 wherein said drag trowel comprises a central, forwardly positioned support frame and a plurality of partially overlapped trowelling leaves flaring outwardly behind said frame and wherein said supply conduit means is rigidly mounted in said frame and extends in cantilever fashion therefrom to connect with said spray nozzle at the longitudinal axis of said trowel near the rearward edges of said trowelling leaves.

24. Apparatus according to claim 21 wherein said spray nozzle is of the air atomizing type and wherein said supply conduit means comprises a separate coating liquid conduit and a separate pressurized air supply conduit each extending through the center of said distributor and through said trowel to said nozzle and each having a flexible section in the region of said pivotal coupling.

25. Apparatus according to claim 24 wherein said coating liquid conduit and said pressurized air conduit each have rigid lengths mounted in said trowel and extending out in cantilever fashion to said nozzle.

* * * * *